No. 864,375. PATENTED AUG. 27, 1907.
E. HOPKINSON.
WHEEL RIM.
APPLICATION FILED SEPT. 13, 1905.

2 SHEETS—SHEET 1.

Witnesses
Raphaël Netter
H. Richard Wöbse

Inventor
Ernest Hopkinson
By his Attorney
Baxter Morton

No. 864,375. PATENTED AUG. 27, 1907.
E. HOPKINSON.
WHEEL RIM.
APPLICATION FILED SEPT. 13, 1905.
2-SHEETS—SHEET 2.
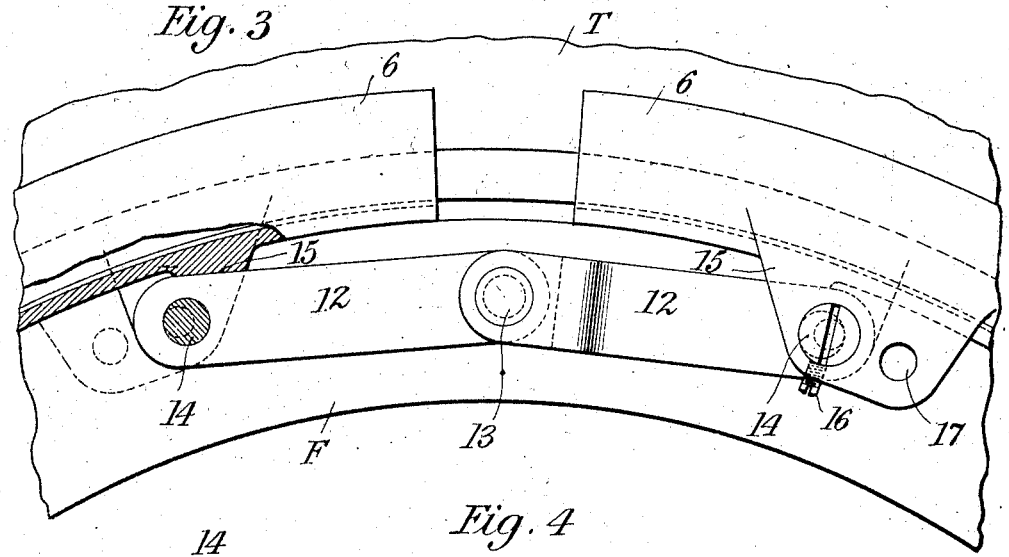
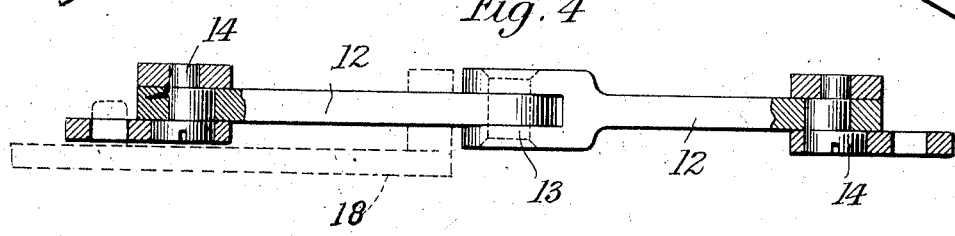
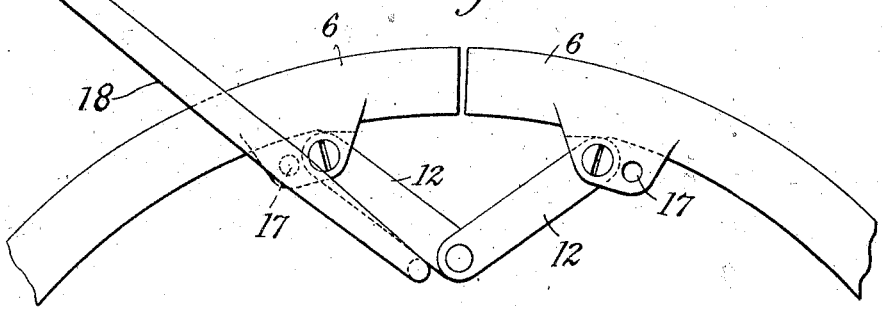
Witnesses
Raphaël Ketter
H. Richard Wöbse
Ernest Hopkinson, Inventor
By his Attorney Baxter Morton

UNITED STATES PATENT OFFICE.

ERNEST HOPKINSON, OF EAST ORANGE, NEW JERSEY.

WHEEL-RIM.

No. 864,375.  Specification of Letters Patent.  Patented Aug. 27, 1907.

Application filed September 13, 1905. Serial No. 278,329.

*To all whom it may concern:*

Be it known that I, ERNEST HOPKINSON, a citizen of the United States, residing in the city of East Orange, county of Essex, and State of New Jersey, have invented new and useful Improvements in Wheel-Rims, of which the following is a specification.

This invention relates to rims for vehicle wheels, and more particularly to rims adapted to receive resilient tires of the pneumatic or other types.

The invention is primarily designed for use in connection with pneumatic tires of the "Dunlop" type, in which an inflatable inner tube is covered and protected by a sheath rifted along its inner side and provided in each edge adjacent to the rift with an endless and inexpansible band or wire.

The principal object of the invention is to provide a rim adapted for use with such tires and of such construction that the tire will be positively clamped when in position upon the rim but will be readily removable from the rim or applicable thereto.

Another object of the invention is to provide a wheel rim adapted to clamp the outer sheath or casing of a "Dunlop" tire at the margins, so as to prevent "creeping" of the tire on the rim, by direct lateral pressure against the edges of the tire sheath.

Other objects of the invention and special features thereof will hereinafter appear as the invention is disclosed in this specification and the accompanying drawings forming a part thereof, in which corresponding parts are designated by similar characters of reference throughout the several views.

Figure 1:
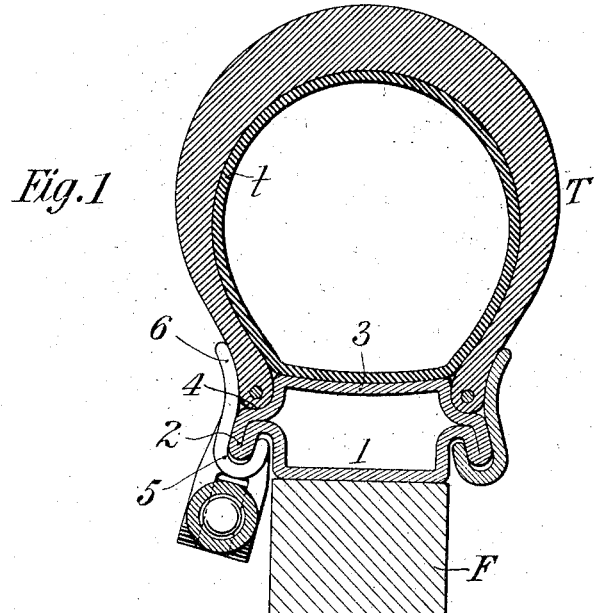
Figure 2:
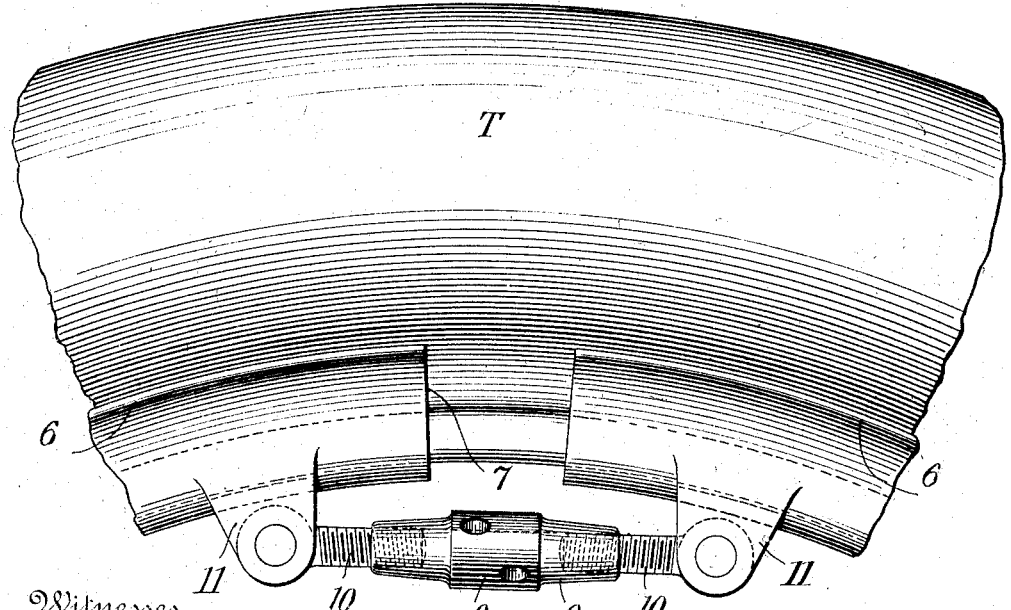

In the drawings: Figure 1 is a view in transverse section through a wheel felly, the improved rim, and a tire of the "Dunlop" type in position upon the rim. Fig. 2 is a fragmentary view in side elevation, showing a section of the tire and of the wheel rim. Fig. 3 is a fragmentary view in side elevation of a section of a tire and rim, showing a modified mechanism for securing one of the removable side flanges in position, a portion of the rim structure being broken away to show internal construction. Fig. 4 is a detail view partly in plan and partly in horizontal section of the side flange securing device shown in Fig. 3. Fig. 5 is a diagram showing a preferred mode of expanding the side flange by means of the devices illustrated in Figs. 3 and 4.

Described in general terms, the rim forming the present invention consists in a main rim member with one or two removable side flanges, each side flange being an expansible split ring which is provided with a channel to receive a bead or a series of lugs upon the tire and with suitable means for securing the side flange upon the main rim member. The main rim member affords a seat for the tire and adjacent to each removable side flange a rabbet is provided for the reception of one margin of the tire sheath or outer casing. Each removable side flange coöperates with the main rim member in positively clamping one margin of the tire sheath in position in the rabbet provided to receive it, the pressure exerted upon the edges of the tire sheath being simply lateral pressure and having little or no tendency to distend the tire sheath at the base.

Referring to the drawings, F designates the felly of the wheel, T the tire sheath and *t* the inflatable inner tube. The main rim member 1, which is preferably of hollow construction, is shrunk or otherwise secured upon the felly F and is characterized by two inwardly disposed beads or lips 2, which are inclined laterally to a slight extent and do not project inward beyond the wheel face of the main rim member. The main rim member 1 may be and preferably is formed from a tube of malleable iron or mild steel by rolling it into the desired form, each bead or lip 2 being of double the thickness of the stock of which the main rim member is formed. The outer surface of the main rim member is characterized by a slightly concave or flat middle portion 3 and two rabbets 4 above or external to the beads or lips 2. Each side flange is preferably of the cross sectional form shown in Fig. 1, presenting a channel 5 near the inner circumference to receive the lips or beads 2 and a laterally and outwardly inclined tire engaging portion 6. Each side flange is divided, as shown at 7 in Fig. 2, and the tendency of each side flange is to contract sufficiently to bring the ends thereof into contact, thus closing the gap in the flange. When a side flange is contracted until the ends of the flange are in contact, the diameter of the side flange is reduced sufficiently to permit the side flange to be seated upon the lip or bead provided therefor on the main rim member. If the side flange be then expanded, the engagement of the channel in the side flange with a slightly inclined lip or bead will force the side flange laterally into engagement with the tire sheath and so clamp the margins of the tire sheath between the side flange and the lateral surface of the rabbet 4 adjacent thereto.

Various devices may be employed to expand the removable side flanges and force them into clamping engagement with the tire sheath. In Fig. 2 I have shown the side flange as provided with a turnbuckle 8 consisting of a sleeve 9 and two threaded members 10 pivoted in lugs 11 formed upon the inner circumference of the side flange. When the sleeve 8 is rotated in one direction, the oppositely threaded members 10 are drawn together, allowing the side flange to contract so as to bring the ends together and permit the easy removal of the side flange from engagement with the main rim member. When the sleeve is turned in the other direction, the side flange is expanded and is firmly seated upon the main rim member.
To obviate the somewhat tedious process of contracting or expanding the side flange by turning the sleeve of the turnbuckle to the required extent, I may employ a toggle joint of the character shown in Figs. 3 and 4. This toggle joint consists of two links or levers 12 connected by a heavy pivot 13 and carried by adjustable eccentrics 14 mounted in lugs 15 on the inner circumference of the removable side flange. To secure the eccentrics in adjusted position, set screws 16 are preferably provided in the lugs to engage with the heads of the eccentrics. The eccentrics are provided in order to compensate for any difference there may be between the sizes of the side flange and the main rim member. Such differences in size will always be small, but some means should be provided for compensating for this difference in size, however small, and for this purpose I preferably make use of the two eccentrics 14. As considerable power may be required to operate the toggle joint, I provide in each pair of lugs 15 a suitable aperture 17 to receive a projection on a lever 18 which is provided with a laterally bent end for engagement with the toggle links, as shown in Fig. 5.

The expansion of the side flanges may be brought about in various ways, but I preferably employ the expanding device shown in Figs. 3 and 4, on account of the quickness with which it may be operated and the security with which the ends of the side flange are held at the proper distance apart. As shown in Fig. 3, the lugs 15 on which the toggle links or levers are mounted permit the links or levers to swing past the position of alinement to a slight extent and positively limit the movement when the links reach the position shown. The normal tendency of the side flange to contract holds the links in this position and prevents the movement of the links toward the axis of the wheel, whereby the side flange would be contracted and released from its engagement with the main rim member.

To force the toggle links into the position shown in Fig. 3 so as to hold the side flange in engagement with the main rim member, the lever 18 is used as shown in Fig. 5. The lateral projection on the lever is fitted into one of the apertures 17 so that the lateral projection may serve as a pivot about which the lever turns, and the end of the lever is brought into engagement with the adjacent toggle link or lever, power being applied to the upper end of the lever in a downward direction. The action of the lever on the toggle joint will, of course, force the toggle links into the position shown in Fig. 3, in which they will remain for the reasons already explained.

To apply a tire to a rim constructed in accord with the present invention, the side flanges must first be removed and the tire placed in position upon the main rim member, with the inner tube $t$ seated upon the outer tire face 3 and the edges of the tire sheath or casing T in position upon the rabbets 4. The side flanges are then brought into engagement with the beads or lips 2 one after the other and expanded by means of the turnbuckle or toggle links, whichever may be provided for that purpose. As each side flange is expanded, the wedging action of the inclined bead or lip with which the side flange engages, will force the tire engaging portion 6 of the side flange into clamping engagement with the tire sheath, thus securing one margin of the tire sheath positively upon the main rim member and rendering any "creeping" of the tire on the rim impossible.

The removal of the tire from the rim can be effected as readily as its application thereto. When the side flanges are contracted by means of the turnbuckle or by forcing the toggle links toward the axis of the wheel, the tire can be removed at once, as the margins of the tire sheath are never wedged upon the outer surface of the main rim member.

When the improved wheel rim is in practical use, it will seldom be necessary to remove the tire from the rim, but it will be necessary to expose the inflatable inner tube whenever a puncture occurs. For this purpose, it is only necessary to remove the side flange upon the exposed side of the wheel. The removal of the side flange leaves one margin of the tire sheath free to be drawn laterally off the main rim member so that the inner tube may be conveniently exposed between the tire sheath and the wheel for repairing.

While I have illustrated only a form of the invention in which the rim is characterized by two removable side flanges, it is obvious that the rim may be constructed with one such side flange only, and the beads or lips may be made coextensive with the main rim member or they may consist of spaced lugs. It will also be seen that various devices other than those shown and described may be made use of to expand the removable side flanges.

For the sake of simplicity of construction, I prefer ably employ side flanges which are each made of a single piece, but each side flange may be made in sections, if desired. Without, therefore, limiting myself to the exact structures shown and described, or enumerating equivalents, what I claim as new and desire to secure by Letters Patent is:

1. The combination in a wheel rim, of a main rim member provided on its outer face with a rabbet to receive and form a seat for one margin of a tire sheath and a contractible and expansible side flange coöperating with said main rim member to clamp the margin of the tire sheath in said rabbet, said main rim member and said removable side flange being so constructed that the expansion of the side flange will effect the clamping of the margin of the tire sheath.

2. The combination in a wheel rim, of a main rim member, an expansible and contractible side flange adapted to be held in engagement with said main rim member when expanded, a pair of toggle links or levers connected with said side flange and forming means for expanding it, and an adjustable connection between said toggle levers and said side flange to compensate for any difference in size between the side flange and the main rim member.

3. The combination in a wheel rim, of a main rim member, an expansible and contractible side flange adapted to be held in engagement with said main rim member when expanded, a pair of toggle links or levers connected with said side flange and forming means for expanding the same, and an eccentric adjustably mounted on the side flange upon which one of said toggle links or levers turns.

4. The combination in a wheel rim, of a main rim member presenting a tire seat on its outer face and provided with an inwardly turned bead or lip beneath said tire seat which is inclined slightly away from the plane of the wheel, and a removable side flange adapted to be brought into locking engagement with said bead or lip by expansion and to be brought into clamping engagement with the tire by the same operation.

In testimony whereof, I have signed my name in the presence of two witnesses.

ERNEST HOPKINSON.

Witnesses:
H. RICHARD WÖBSE,
RALPH A. HANCOCK.